June 18, 1929.  B. DE MATTIA  1,717,437
TIRE BUILDING CORE
Filed Dec. 31, 1925  2 Sheets-Sheet 1
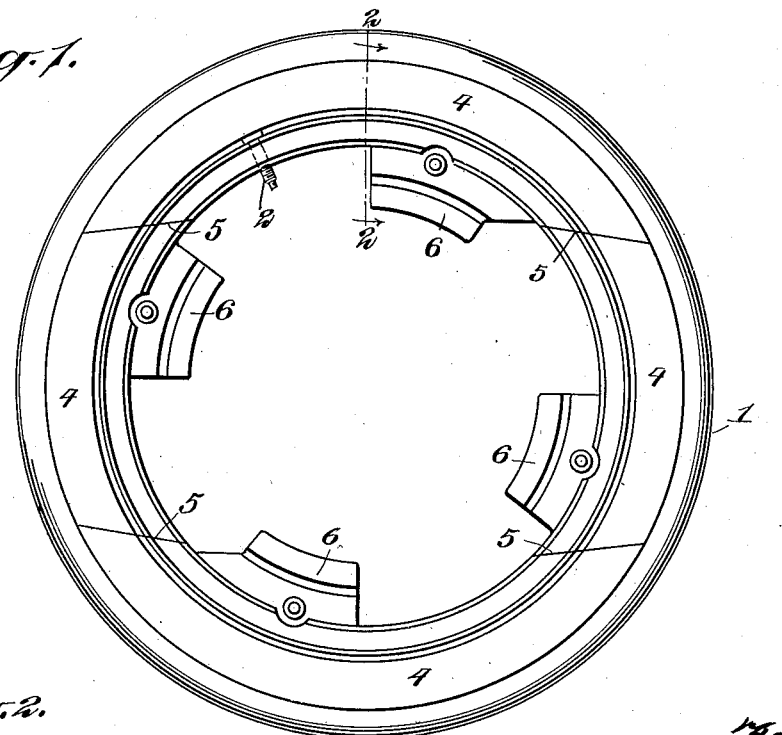
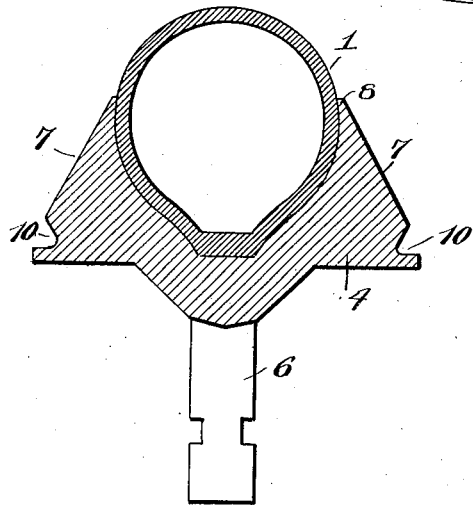
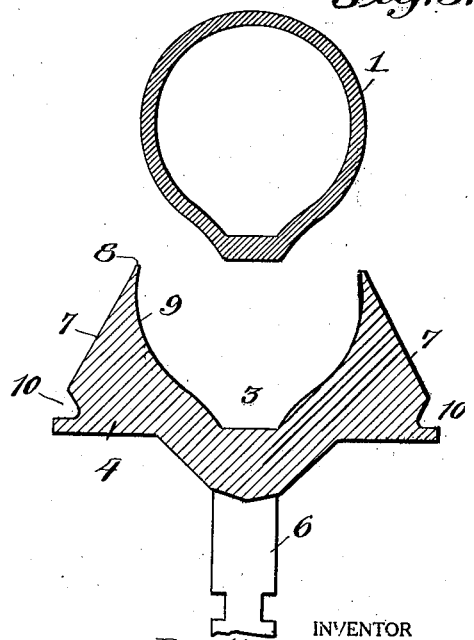
WITNESSES
INVENTOR
Barthold De Mattia
BY
ATTORNEYS June 18, 1929.  B. DE MATTIA  1,717,437
TIRE BUILDING CORE
Filed Dec. 31, 1925  2 Sheets-Sheet 2
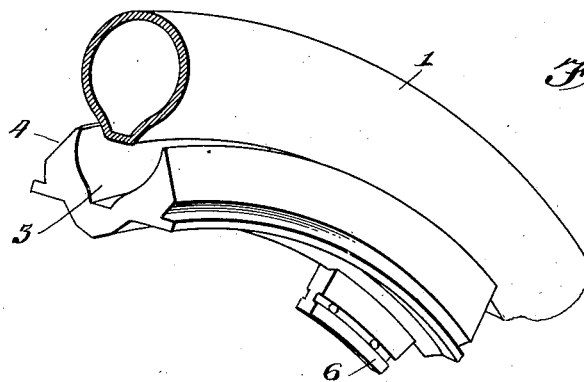
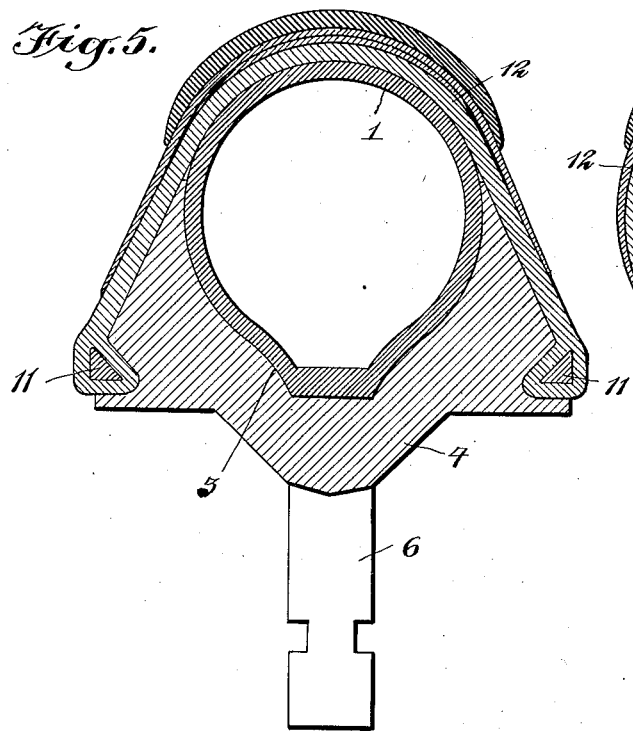
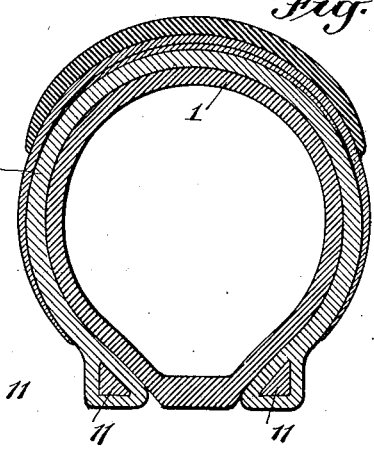
INVENTOR
Barthold De Mattia
BY
ATTORNEYS Patented June 18, 1929.

1,717,437

UNITED STATES PATENT OFFICE.

BARTHOLD DE MATTIA, OF CLIFTON, NEW JERSEY, ASSIGNOR, BY MESNE ASSIGNMENTS, TO NATIONAL RUBBER MACHINERY COMPANY, OF AKRON, OHIO, A CORPORATION OF OHIO.

TIRE-BUILDING CORE.

Application filed December 31, 1925. Serial No. 78,623.

The present invention relates to tire building cores and more particularly to a tire building core designed to facilitate the manufacture of tires by a process in which the tire or shoe is built up with the wall above the beaded edges substantially flat and converging towards the crown or tread; the beaded edges being thereafter moved towards each other to bring them to a position closely adjacent and thus to impart to the tire substantially the standard shape and thereafter vulcanizing the tire.

In carrying out such process prior to the present invention, it has been customary to entirely remove the core over which the tire was built up and to place within the tire an "air bag" or former, preliminary to placing the tire into vulcanizing molds, and this not only involves delay, but results in an objectionable distortion of the air bag, causing its premature destruction on account of the folding action required to place it in the inner walls of the tire.

The object of the present invention is to produce a core so constructed that by virtue of its inclined divergent sides any tire may be built more quickly thereon and that the portion which imparts the inclined shape to the walls of the tire may be removed, leaving within the tire the "air bag" portion of the core over which the crown or tread portion was shaped, and which, when the inclined portion is removed, imparts the ultimate shape to the side walls together and in unison with the crown or tread portion.

The invention may be said to consist of a two-part core adapted to be fitted together for conjoint use to impart the preliminary shape to the tire, after which one member is removed from the tire but the other member is consecutively used to effect the final shape to said tire.

The invention is illustrated in the accompanying drawings in which:—

Fig. 1 shows the core in side elevation.

Fig. 2 shows a transverse sectional view taken on the line 2—2 in Fig. 1 looking in the direction of the arrows in that figure.

Fig. 3 is a view similar to Fig. 2 but with the parts of the core separated.

Fig. 4 is a perspective view showing portions of the core parts separated.

Fig. 5 is a sectional view through the core assembled for conjoint use and showing a tire built up thereon.

Fig. 6 shows the tire brought to final shape about the continuous core members preliminary to vulcanization.

Similar reference characters will be employed to designate corresponding parts.

The core comprises a core member 1 which preferably consists of a continuous annular tube formed of rubber and having a valve 2 by which it may be inflated or deflated and may be the usual "air bag" well known to those familiar with this art. The member 1 is received within a channel 3 formed about the periphery of core members 4 which are made of cast iron or other suitable material. As it is intended that the members 4 shall be capable of being removed, they will be of a suitable number and so formed as to be readily collapsible. As shown in Fig. 1 there are four of these members divided by the cuts 5 and each member is provided with a shank 6 by means of which it may be connected to suitable supports not shown whereby the oppositely disposed members may be moved inwardly toward each other and simultaneously out of the plane of the core until they shall have been entirely removed from the core member 1. It is of course understood that in the collapsing movement the two smaller members at the sides as shown in Fig. 1 are to be first withdrawn and collapsed and thereafter the upper and lower members will be withdrawn and collapsed.

The core members 4 are provided with outer beveled surfaces 7 which at their upper or outer edges converge at 8 with the inner walls 9 which are slightly concave and approach each other at the bottom of the groove 3 being slightly convex at their lower parts. Below the beveled surfaces 7 of the members 4 are formed grooves or channels 10 to receive the beaded edges 11 of the tire 12 as shown in Fig. 5.

In the operation of the core the parts are assembled as shown in Figs. 1, 2 and 5, and when so assembled the tire 12 is built up as indicated in Fig. 5 with the walls below the crown or tread supported by the flat beveled surfaces 7 with the crown or tread portion supported by the inflated section 1. Thereafter the sections 4 are collapsed and withdrawn and the walls of the tire below the crown or tread are conformed to the section 1 by moving the beaded edges 11 toward each other as shown in Fig. 6, and the section 1 with the tire thereon placed within the usual vulcanizing mold for vulcanization or curing the tire, after which the section 1 may be removed from the cured tire and the core members reassembled for a further operation.

Having described my invention, I claim:—

1. A tire building core upon which a tire is fabricated in a green or unvulcanized condition substantially in the form of an inverted V in cross section, said core comprising a continuous annular elastic inflatable outer member corresponding in shape when inflated to the interior of the finished or vulcanized tire and having means for inflating said member, and a metallic inner member provided with a groove or seat to receive and position the outer member with its outer peripheral portion projecting therefrom, the inner member having outwardly extending bevelled surfaces upon opposite sides of the groove or seat and merging with the projecting peripheral portion of the outer member when the latter is positioned in the groove or seat of the inner member, the members being fitted together for conjoint use and separable for the independent use of the outer member in vulcanizing the green or unvulcanized tire.

2. A tire building core upon which a tire is fabricated in green or unvulcanized condition substantially in the form of an inverted V in cross section, said core comprising an elastic inflatable outer annular member corresponding in shape when inflated to the interior of the finished or vulcanized tire and having means for inflating said member and a sectional collapsible metallic inner member, the inner member having a peripheral seat or groove to receive the outer member and having lateral walls upon opposite sides of the seat or groove outwardly and downwardly inclined from the outer peripheral edges of the seat or groove toward the base thereof, the members being removably connected for conjoint use and separable for the independent use of the outer member in vulcanizing the green or unvulcanized tire.

3. A tire building core upon which a tire is fabricated in a green or unvulcanized condition substantially in the form of an inverted V in cross section, said core comprising an elastic inflatable outer annular member corresponding in shape when inflated to the interior of the finished or vulcanized tire and having means for inflating said member, and a sectional collapsible metallic inner member, the inner member being provided with a peripheral seat or groove to receive the outer member, the outer lateral walls of the inner member being outwardly and downwardly inclined from the outer peripheral edges of the seat or groove toward the base of said walls and each of said walls having a bead receiving groove near the base thereof, said members being removably connected together for conjoint use and separable for the independent use of the outer member in vulcanizing the green or unvulcanized tire.

4. A tire building core upon which a tire is fabricated in green or unvulcanized condition, said core comprising an annular elastic inflatable member corresponding in shape when inflated to the interior of the finished or vulcanized tire and having means for inflating said member, and a collapsible metallic inner member formed with a peripheral groove wherein the outer member is snugly but removably seated, the walls of said groove extending radially outward beyond the widest part of the elastic outer member to prevent its lateral spreading when inflated during the tire building operations.

5. A tire building core upon which a tire is fabricated in green or unvulcanized condition substantially in the form of an inverted V in cross section, said core comprising an annular elastic inflatable member corresponding in shape when inflated to the interior of the finished or vulcanized tire and having means for inflating said member, and a collapsible metallic inner member formed with a peripheral groove wherein the outer member is snugly but removably seated, the walls of said groove extending radially outward beyond the widest part of the elastic outer member to prevent its lateral spreading when inflated during the tire building operations and exposing only the crown portion of the outer member for the shaping of the tread of the tire, and the outer faces of said walls being oppositely inclined and substantially tangential to the outer surfaces of the inflated outer member for the shaping of the sides of the tire.

6. A tire building core upon which a tire is fabricated in green or unvulcanized condition substantially in the form of an inverted V in cross section, said core comprising an annular elastic inflatable member corresponding in shape when inflated to the interior of the finished or vulcanized tire and having means for inflating said member, and a collapsible metallic inner member formed with a peripheral groove wherein the outer member is snugly but removably seated, the walls of said groove extending radially outward beyond the widest part of the elastic outer member to prevent its lateral spreading when inflated during the tire building operations and exposing only the crown portion of the outer member for the shaping of the tread of the tire, and the outer faces of said walls being oppositely inclined and substantially tangential to the outer surfaces of the inflated outer member for the shaping of the sides of the tire, and formed at their inner extremities with outwardly facing grooves for the shaping of the bead portions of the tire.

BARTHOLD DE MATTIA.